UNITED STATES PATENT OFFICE 2,080,422

PASSIVE HYDRAULIC MEDIUM

Kenneth Harry Hoover, Deerfield, Ill., assignor to Association of American Soap & Glycerine Producers, Inc., New York, N. Y., a corporation of Delaware No Drawing. Application June 30, 1934,
Serial No. 733,240

6 Claims. (Cl. 252—5)

This invention resides in a composition of matter constituting an hydraulic medium suitable for various hydraulic purposes, including heat dissipation. The composition comprises an aqueous solution of monohydric or polyhydric alcohols and a relatively minute amount of urea, together with such other added ingredients as may be suitable or convenient.

The composition of this invention finds its principal application as a cooling medium for the conventional internal combustion engine where alcohol solutions are commonly employed and where rusting of iron is ordinarily severe. The composition of this invention, however, is decidedly passive or inert with respect to iron at elevated temperatures and the severe rusting which ordinarily occurs is not evident when the composition of this invention is employed.

My new composition develops its most useful properties as soon as it has been heated to a certain extent and it is, therefore, particularly useful under such conditions of usage of aqueous alcohol solutions as, for example, in the cooling system of a conventional internal combustion engine of the liquid-cooled type, where alcohol solutions are commonly employed as anti-freezing liquids and coolants and where the rusting of iron is ordinarily severe.

I have discovered that if a small amount of urea is added to the aqueous solution of a mono- or polyhydric alcohol, the resulting compositions will become much more inert with respect to iron during relatively long periods of usage than the corresponding alcohol solutions not so treated. This protective action probably results in part at least from the combined action of water and heat on urea, ammonia and carbon dioxide being among the known products which result. Until some slight decomposition of urea occurs, little inhibiting action is observed, but once this inhibiting action is established, marked inhibition of iron corrosion persists. I am unable to say whether or not this inhibiting action is due to the degradation products singly or collectively, or in conjunction with the urea itself. In any event the area constitutes a very useful reservoir of products which render aqueous alcohol solutions substantially inert with respect to iron.

Various specific nitrogenous substances have been used for various purposes in hydraulic compositions heretofore. In some cases these specific substances have been employed as the principal freezing point depressant and have been employed in the composition in proportions ranging from ten to seventy per cent. In the composition of this invention the quantities of urea employed are relatively minute and are without any practical effect upon the freezing point of the mixture.

In practicing this invention at times it may be advantageous to employ the following specific compositions: 2½ parts of urea are dissolved in 1000 parts of methanol, ethanol, glycol, or glycerol, or mixtures of one or more of the same. To the above solution is added aproximately 1500 parts of water. This forms a suitable hydraulic medium for use in the cooling systems of automobiles, furnishing therein protection against freezing according to the well known properties of the alcohols and at the same time being far more inert with respect to iron than a corresponding alcoholic solution without any content of urea.

Other examples of the composition which may be useful at times are the following: One part of urea is dissolved in 2000 parts of glycerol. To the above solution is then added approximately 3000 parts of water. Or in cases it may be advantageous to employ 5 parts of urea dissolved in 100 parts of methanol, to which there may be added 150 parts of water. The various compositions are useful and advantageous under various conditions of use.

At times it may be suitable and convenient to include in the composition of this invention added ingredients, the purpose of which is to either add to the inhibiting effect of the urea, or to perform functions in addition thereto. For example, in my copending application, Serial No. 599,595, I have disclosed compositions containing an alcoholic substance in solution, as well as other ingredients. I have found that the urea is useful in conjunction with the compositions disclosed in the aforesaid application and may be utilized therewith to further augment the effectiveness thereof. Therefore, at times it may be convenient to practice the present invention by employing the composition prepared as follows: Two parts of mercaptobenzothiazole are dissolved in approximately 1000 parts of an alcohol, for example, methanol, ethanol, glycol, or glycerol, under strong agitation. The rate of solution may be accelerated, if desired, by heating, preferably not to exceed 100 degrees C. When dissolved, ½ to ten parts of urea are added and the agitation continued until the solution thereof is completed. Four to fifteen parts of an oil mixture containing an emulsifier are then added under vigorous agitation. This oil mixture may consist of about 1¼ parts of sodium naphthenates dissolved in about 8¾ parts of a paraffin base mineral oil having a Saybolt viscosity of approximately 200 seconds at 100 degrees F. The sodium naphthenates may be prepared by neutralizing with sodium hydroxide, a crude mixture of naphthenic acids derived from petroleum oil, the acids having a boiling range of about 160 to 190 degrees C. at 6 mm. absolute pressure and an acid value of approximately 118. To this composition may then be added any amount of water, more or less, depending upon the extent of protection against freezing desired.

The hydraulic medium of this invention is easily prepared at moderate cost and a very useful composition is produced in which the normal corrosive tendency of alcohol subject to oxidation is overcome by a relatively inactive ingredient present in very minor quantities which apparently becomes converted as needed.

When used herein, the term "alcoholic substance" is intended to mean one or more of the group represented by methyl alcohol, ethyl alcohol, glycols, and glycerol.

I have found through long experiment and careful study that the effect of urea in this respec is unique. A great multitude of substances have been investigated to the effect that none of these contains all of the useful purposes which urea exhibits when employed in the composition of this invention.

While specific examples have been given herein illustrating the application of the composition of this invention, it is intended that the protection of Letters Patent obtained hereon be not limited thereby, but be limited to the true scope of the invention as represented by appended claims.

What I claim as my invention is:

1. An anti-corrosive, hydraulic medium comprising a composition containing an alcohol in sufficient quantity to materially and effectively lower the freezing point, water, and corrosion inhibiting quantities of urea.

2. An anti-corrosive, hydraulic medium comprising a composition containing an alcohol as a main constituent and a corrosion inhibiting quantity of urea.

3. An anti-corrosive, hydraulic medium comprising a composition containing an alcohol in sufficient quantity to materially and effectively lower the freezing point, water, and $\frac{1}{50}$ to 2 per cent of urea.

4. An anti-corrosive, hydraulic medium comprising a compostion containing monohydric alcohol in sufficient quantity to materially and effectively lower the freezing point, water, and $\frac{1}{50}$ to 2 per cent of urea.

5. An anti-corrosive, hydraulic medium comprising a composition containing polyhydric alcohol in sufficient quantity to materially and effectively lower the freezing point, water, and $\frac{1}{50}$ to 2 per cent of urea.

6. An anti-corrosive, hydraulic medium comprising a composition containing glycerol in sulcient quantity to materially and effectively lower the freezing point, water, and $\frac{1}{50}$ to 2 per cent of urea.

KENNETH HARRY HOOVER.